(No Model.)

J. W. HILL.
Grain-Meter.

No. 227,689. Patented May 18, 1880.

Attest
Collin Ford, Jr.
J. B. Dorman

Inventor.
John W. Hill

UNITED STATES PATENT OFFICE.

JOHN W. HILL, OF CINCINNATI, OHIO.

GRAIN-METER.

SPECIFICATION forming part of Letters Patent No. 227,689, dated May 18, 1880.

Application filed March 8, 1880. (No model.)

*To all whom it may concern:*

Be it known that I, JOHN W. HILL, of Cincinnati, in the county of Hamilton and State of Ohio, have invented certain new and useful Improvements in Automatic Grain-Weighers, of which the following is a specification.

My invention is in the nature of an improvement upon an automatic grain-weigher for which Letters Patent were granted me April 15, 1873, and has for its objects, first, the division and arrangement of the balancing-weight on one end of the beam in such a manner that great precision can be had in the weighing of grain; second, the construction and arrangement of the cut-offs which check the flow of grain from the grain-spout in such a manner that the final quantity of grain will be slowly spouted into the bucket; and, third, the construction and arrangement of one or more balance-bobs, which rests or rest upon but are not connected with the beam of the weigher, which will supply to the beam a weight equal to the weight of the secondary cut-off, to maintain a uniform weight on the bucket end of the beam during the closing of the secondary cut-off.

Figure 1:
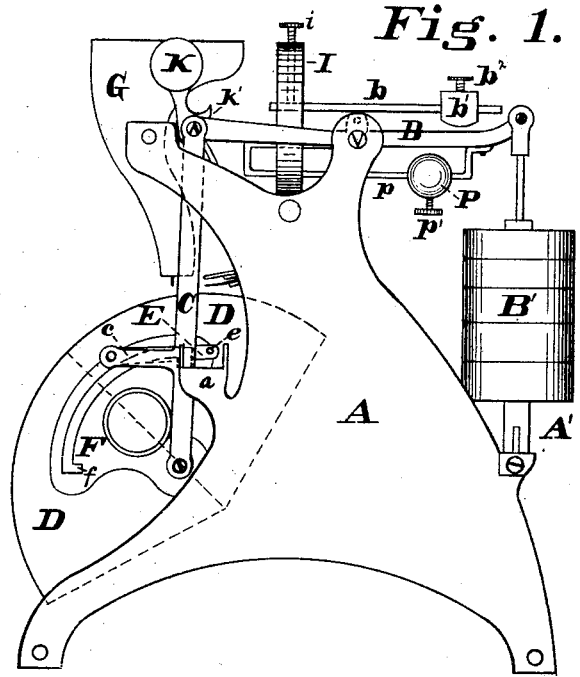
Figure 2:
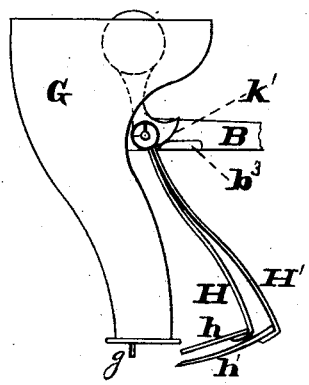
Figure 3:
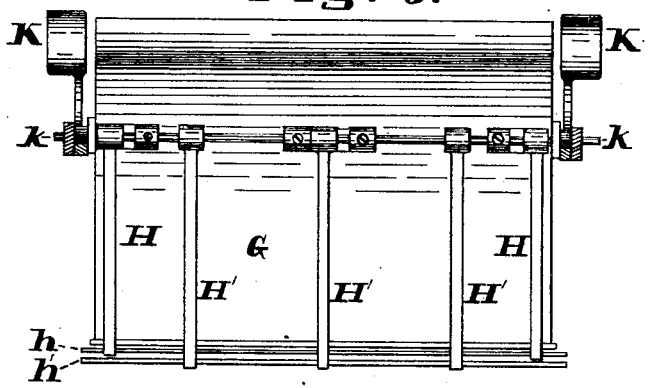
Figures 4, 5:
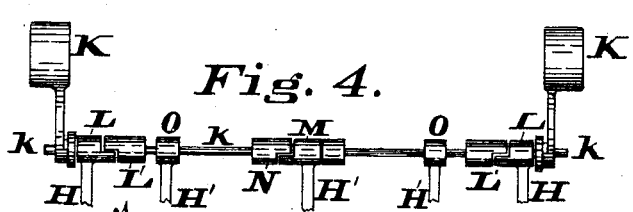

In the accompanying drawings, Figure 1 is an elevation of my improved grain-weigher. Fig. 2 is an end elevation, and Fig. 3 a side elevation, of the grain-spout. Fig. 4 is a detached view of the balance-bobs, rock-shaft, and clutches; and Fig. 5 is a detached view of the balance-beam, supplemental beam, and supplemental weight.

Similar letters of reference indicate similar parts.

A is a side frame of any suitable material, of which there are two to each machine.

B is the balancing-beam, upon one end of which is suspended, on frictionless pivots, the main balancing or weighing weight B′, and at the opposite end of the beam, similarly suspended by links or suspenders C, is placed the dumping grain-bucket D.

$c$, E, $e$, F, $f$, and $a$ are the devices for retaining the bucket D in position for the reception of and for causing the automatic discharge of the weighed grain, all of which are fully described in my former patent referred to.

$b$ is a small beam pivoted to the upper side of the main beam B, upon one end of which is placed the supplemental weight $b'$, secured to the beam by the thumb-screw $b^2$.

Although the supplemental weight $b'$ is shown secured to the beam $b$ by a screw, it is preferable to permanently secure it to the beam by a pin driven through the weight and beam after the weight has been properly adjusted in position.

The forward end of the small beam $b$ passes under the arch I, which spans the space between the two side frames and carries the adjusting-screw $i$, against the lower end of which the small beam $b$ rests.

By turning the screw $i$ up or down the weight $b$ is caused to approach or recede from the beam B, by which means any desired motion of the beam and the main balancing-weight B′ may be had before the supplemental weight $b'$ comes in contact with the beam B.

The weight B′ is sufficiently heavy to balance the weight of the bucket and suspenders upon the forward end of the beam and to partially balance the load of weighed grain taken in the bucket D. The remainder of the load of weighed grain is balanced by the small weight $b'$.

G is the hopper and spout, firmly secured to the frame of the weigher, and made large at the upper end to receive the spout from the grain-bin above. The spout G is curved in form to check and destroy the momentum of the grain, and is provided with a long narrow mouth at the bottom to direct the grain into the bucket D. H H are arms suspended from clutches L L on the rock-shaft $k$, said rock-shaft being mounted in bearings on the ends of the spout G. H′ H′ H′ are arms suspended from the rock-shaft by the loose collars O O and the clutch M. L′ L′ are clutches firmly secured to the rock-shaft $k$, which engage with the loose clutches L L, and cause the arms H H to rise or fall, according as the rock-shaft is revolved one way or the other. N is a clutch secured to the rock-shaft $k$, to engage with and oscillate the loose clutch M and arms H′ H′ H′.

To the ends of the rock-shaft $k$ are secured the balance-bobs K K, which roll up and down as the rock-shaft oscillates in its bearings. The balance-bobs are provided with rolling toes $k'$ $k'$, which are provided with curved faces. The toes $k'$ $k'$ rest upon the lifting-toes $b^3$ $b^3$, secured to the forward end of the beam. As the forward end of the beam B rises or falls the toes $k'$ $k'$, and consequently the balance-bobs K K, oscillate through a given angle in paths described from the center of the rock-shaft $k$.

The cut-off $h$ is adjustably secured to the arms H H, and the cut-off $h'$ is adjustably secured to the arms H' H' H'. The cut-offs $h$ and $h'$ are so arranged with relation to the mouth of the spout G and to each other that while the cut-off $h$ slides freely under the mouth of the spout G the cut-off $h'$ slides freely under the cut-off $h$.

$g$ is a stop-pin, one upon each end of the spout, to arrest and limit the motion of the cut-off $h$, from which it will be observed that the full motion of the cut-off $h$ only partially closes the opening in the spout, the final checking of the flow of grain being accomplished by the cut-off $h'$.

The fixed clutches L' L' and N are so adjusted upon the rock-shaft that the edges of the cut-offs $h$ and $h'$ coincide with each other; and when the beam B is in its normal position the edges of the cut-offs are slightly behind the inner edge of the spout, thereby affording an unrestricted opening for the delivery of the grain.

Under the beam B, I suspend an adjusting-weight, P, which freely slides upon the stirrup $p$, and can be secured in any desired position by means of the thumb-screw $p'$. By varying the position of the weight P with relation to the weight B' any desired adjustment of the weight of grain taken in the bucket may be had. Thus by sliding the weight P nearer to the weight end of the beam B the loads taken by the bucket D will be increased, and by sliding the weight P nearer to the bucket end of the beam the weight of grain taken in the bucket will be diminished.

The operation of the machine is as follows: The bucket D having discharged the load previously taken, has returned to its normal position under the spout G. Grain flows from the spout through the full opening thereof until about fifteen-sixteenths of the desired quantity has been taken. The resistance to the descent of the bucket being then overcome, the weight B' rises until the small weight $b'$ rests upon the beam B. An additional resistance to the descent of the bucket being now imposed, its motion is temporarily checked until the final quantity of grain to make the desired weight has been taken, when the bucket descends and discharges its load. The same motion of the beam which lifts the weight B' from a state of rest and accompanies the partial descent of the bucket D also causes the cut-off $h$ to slide under the grain-spout G and partially check the flow of grain, the rise of the rear end of the beam and the closure of the cut-off $h$ against the stop-pins $g$ being so timed that directly the small weight $b'$ rests upon the beam B the cut-off $h$ has closed against the stop-pins $g$ $g$.

In this position a very narrow opening for the entire length of the spout is provided, through which the final quantity of grain required to complete the weighed load in the bucket and balance the weights B' and $b'$ is taken, when the slightest depression of the forward end of the beam moves the cut-off $h'$ under the spout G and completely checks the flow of grain. The bucket then descends and dumps the load of grain by means of the mechanism and as described in my former Letters Patent, already referred to.

The toes $k'$ $k'$ constantly rest upon the lifting-toes $b^3$ $b^3$, and through the toes $k'$ $k'$ and $b^3$ $b^3$ the balance-bobs K K impose a certain load upon the forward end of the beam for any given position the balance-bobs may occupy. The normal position of the balance-bobs being slightly beyond a vertical, as shown in Figs. 1 and 2, the first downward motion of the forward end of the beam B during the closure of the cut-off $h$ draws the balance-bobs over toward the beam B, and places them in position to rapidly accelerate the weight on the beam as the bucket descends during the closure of the cut-off $h'$. Meanwhile the weight on the beam imposed by the balance-bobs increases in effect, a corresponding weight is being removed by the closure of the cut-off $h'$, and directly the cut-off $h'$ has traveled entirely across the narrow opening in the spout, already described, the weight upon the beam, by reason of the peculiar motion of the balance-bobs, is rapidly increased, and the beam is forced down by the combined weight of the grain in the bucket and the balance-bobs, and the weighed grain in the bucket discharged.

The balance-bobs K K are so adjusted in weight and position on the rock-shaft relative to the cut-off $h'$ that the reduction of weight on the beam by reason of the closure of the cut-off $h'$ is exactly restored in time and quantity by the balance-bobs K K acting through the toes $k'$ $k'$ and $b^3$ $b^3$. The working surfaces of the toes $k'$ $k'$ and $b^3$ $b^3$ are arcs of curves so adapted to each other that the toes $k'$ $k'$ roll upon the toes $b^3$ $b^3$ without friction.

It is obvious that several variations may be made in the construction of my machine without departing from the principles of the invention. Thus, equivalent mechanism can be substituted for the fixed clutches L' L' and N and the loose clutches L L and M for moving the cut-offs $h$ and $h'$; but I prefer to use the mechanism shown, as being very simple, inexpensive, and not liable to derangement or injurious wear. Again, the adjustment of the separation between the weight $b'$ and the beam B is had by means of a tempering-screw, and as this screw is usually secured in position by a lock-nut after the adjustment has been made, it is obvious that with great care in the construction of the machine a fixed stop secured to the arch I, or a suitable projection from the under side of the arch, will answer as well as the screw $i$, and the balance-bobs K K are here shown with the toes $k'$ $k'$ as simple projections from the hubs of the bobs; but if, for any reason, it is more convenient to make the balance-bobs and curved toes of separate pieces, it can be done without departing from the principle of the invention. Experience, however, has shown that it is more convenient and less expensive to combine the balance-bobs K K and toes $k'$ $k'$ as they are herein described.

Although I have shown my invention as an improvement upon a certain automatic grain-weigher for which Letters Patent have already been granted to me, it is obvious that the principle of the invention herein described is not limited in application to machines for the automatic weighing of grain, as it may be applied with equally successful results to machines for the automatic weighing of spirits, water, acids, and many other substances capable of being spouted.

Having described my invention, what I claim is—

1. In machines for the automatic weighing of grain and other substances, the balance-bobs K K, having curved toes $k'$ $k'$, in combination with the beam B, having lifting-toes $b^3$ $b^3$, for the purpose and as described.

2. In machines for the automatic weighing of grain and other substances, the balance-bobs K K, having curved toes $k'$ $k'$, in combination with the rock-shaft $k$, fixed clutches L' L' and N, loose clutches L L and M, and cut-offs $h$ and $h'$, for the purpose and as described.

3. In machines for the automatic weighing of grain and other substances, the combination of the curved toes $k'$ $k'$, rock-shaft $k$, fixed clutches L' L' and N, loose clutches L L and M, with the lifting-toes $b^3$ $b^3$, and cut-offs $h$ and $h'$, for the purpose and as described.

4. In machines for the automatic weighing of grain and other substances, the combination of the beams B and $b$, weights B' and $b'$, stop $i$, and grain-bucket D, for the purpose and as described.

5. In machines for the automatic weighing of grain and other substances, the combination of the curved toes $k'$ $k'$, rock-shaft $k$, fixed clutches L' L' and N, loose clutches L L and M, and cut-offs $h$ and $h'$ with the fixed grain-spout G, for the purpose and as described.

In testimony whereof I have signed my name to the foregoing specification in the presence of two subscribing witnesses.

JOHN W. HILL.

Witnesses:
 AMBROSE TEMPLE,
 COLLIN FORD, Jr.